JAMES M. FOLSOM.
Improvement in Mechanical Device.
No. 123,686. Patented Feb. 13, 1872.
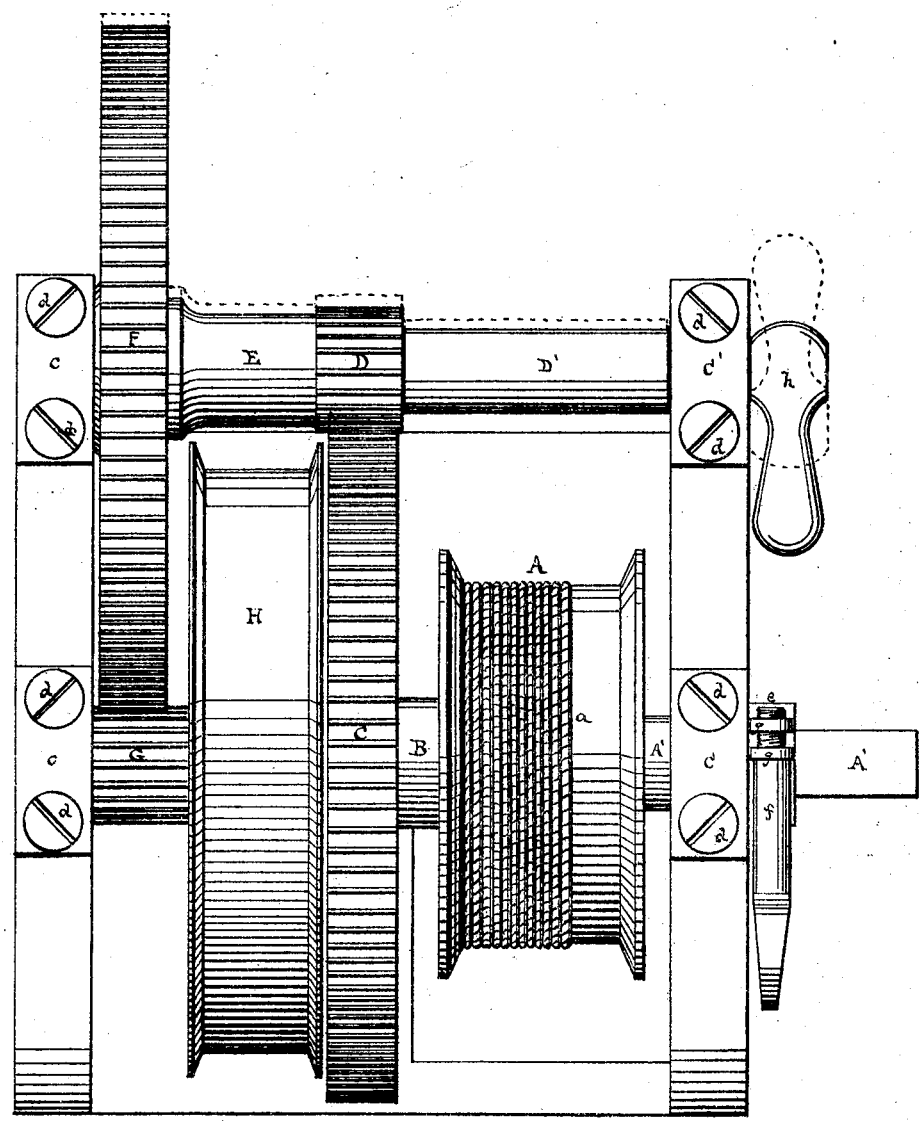
Witnesses.
A. M. Stout Jr.
F. W. Howard
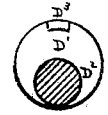
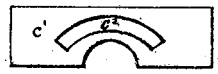
Inventor.
James M. Folsom
by A. M. Stout
Atty

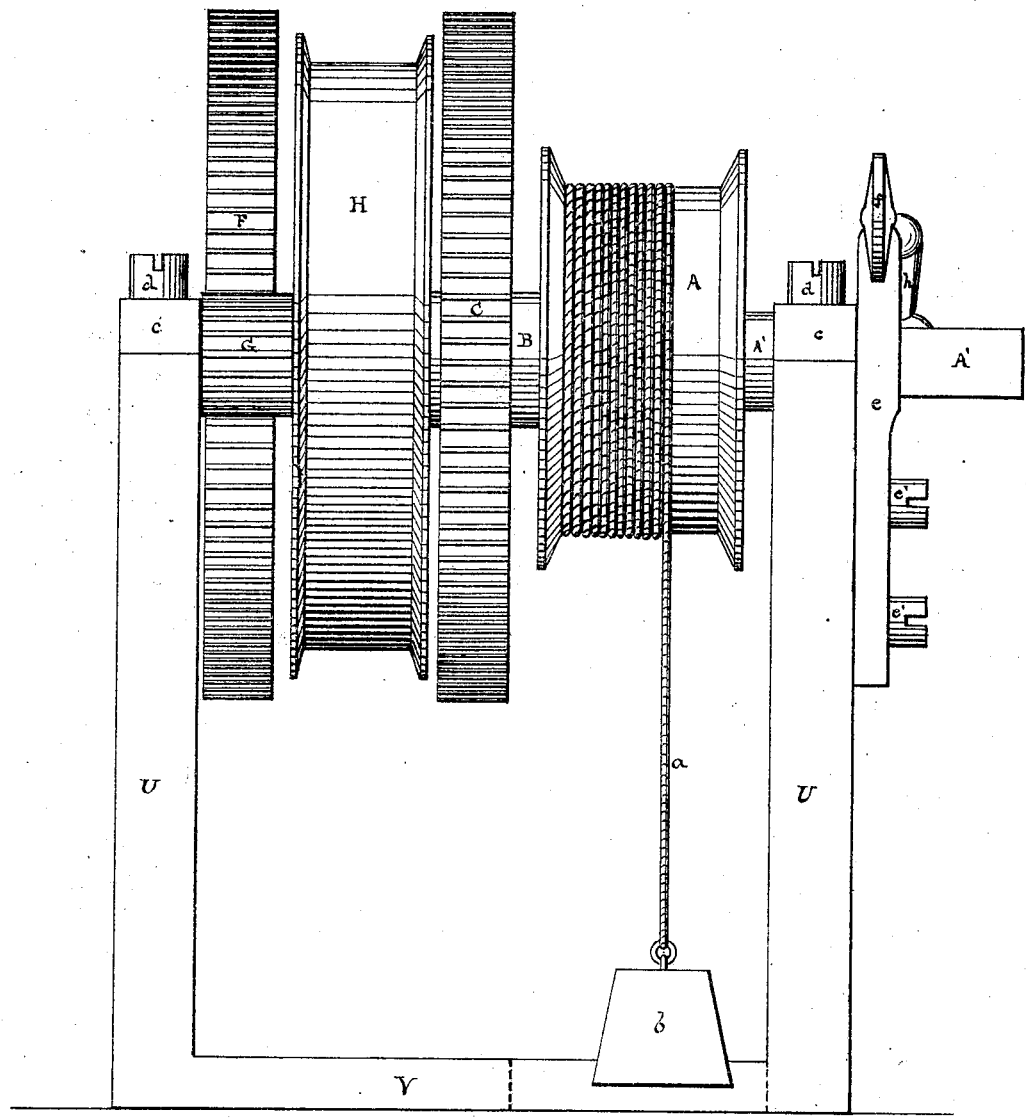

123,686

UNITED STATES PATENT OFFICE.

JAMES M. FOLSOM, OF LOUISVILLE, KENTUCKY.

IMPROVEMENT IN MECHANICAL DEVICES.

Specification forming part of Letters Patent No. 123,686, dated February 13, 1872.

Specification describing an Improved Mechanical Device, invented by JAMES M. FOLSOM, of the city of Louisville, in the county of Jefferson and State of Kentucky.

My invention consists in the combination and arrangement of a number of cog-wheels and pinions and their shafts in a comparatively small and convenient space in such a manner that when a drum fixed upon one of the shafts, and having a cord, band, or chain attached thereto at one end and wound around it and a weight attached to the other, such drum will be turned by such weight, and its velocity shall be greatly multiplied, and the application of the power exerted by a weight, through the gearing above mentioned, made to the driving of light machines, such as the sewing-machine; and further, in making such weight and the space through which it shall move in being wound up and run down in such proportions as to make the device cheap and convenient for such a use as the one mentioned.

In the accompanying drawing, Figure 1 represents a front elevation of the device, including its frame; Fig. 2, a plan view of the same; Fig. 3, a cross-section of the journal of the rear shaft; and Fig. 4, a side view of the top piece of the box of the journal.

A is the drum or weight-pulley; A', the shaft upon which it and the cog-wheel C are made fast so as to turn with it. $c$ is the cap for its journal-box. $b$ is the weight, and $a$ the cord. Now, when the drum A revolves the cord unwinds and the shaft and the wheel C revolve, and this latter-named wheel turns the pinion D, which, together with cog-wheel F, are attached to the hollow cylinder E, which itself revolves upon the shaft $D^1$, and wheel F revolves pinion G, which pinion, together with band-pulley H, turn freely on shaft A'. Now, if wheel C have two hundred cogs and pinion D have only twenty, then for every revolution of the drum A' and wheel C the pinion D and wheel F will make ten, and for every revolution of the latter the pinion G and pulley H make ten, and then of course for every revolution of the weight-pulley A the band-pulley H will make one hundred revolutions. If greater increase of velocity be required the shafts may be made longer and the pulley H left off, and another cog-wheel be attached to pinion G and turn with it upon shaft A' and mesh with and turn another pulley on shaft $D^1$, and then another cog-wheel, attached to the last-named pulley, may be made to turn on that shaft and mesh with and turn another pinion, together with pulley H, on shaft A', and so on *ad infinitum;* then, by placing two more wheels and pinions on the same shafts, the pulley H would be caused to revolve ten thousand times, while the weight-pulley A would make but a single revolution. At that rate of speed the band-pulley H would drive a sewing-machine several hours after once winding up.

The principal drawbacks upon the usefulness of this device are, first, the waste of power in overcoming friction—the friction in the gearing; second, the time and labor required to wind it up and the inconvenience of providing vertical space through which the weight is to descend in order to turn the machine for several hours before running down. The effects of these may be lessened by good construction and ordinary mechanical ingenuity. In regard to the required vertical space for the weight, I will suggest that the cord may be passed through the floor of the room in which the machine is operated; and the weight may be allowed to descend from such floor in an angle in the wall to the next below; or it might be passed over a pulley in the ceiling above the machine, and thus have a vertical space of from eight to fifteen feet.

The objection to the use of a spring as a motor for sewing-machines has been that the spring, in order to run the machines a few hours without stopping to wind up, would have to be so large as to occupy too much space for convenience and cost too much to be cheap.

Operated by the thumb-screw $f$ and bolted to the side of the frame, is a brake, $e$, with which to regulate or stop the revolving of the shaft A' as may be desired. By Fig. 3 is shown the journal $D^2$ of the shaft $D^1$; and $D^3$, a projection on the end of the same. By reason of the eccentric position of the journal upon shaft the pinion D is thrown out of gear with wheel C, and when so thrown out the position of that shaft and the handle $h$ is shown by the dotted lines in Fig. 2. The turning of that shaft $D^1$ is limited by the projection $D^3$ and the groove $C^2$ in the top $C^1$ of its journal-box.

Claims.

What I claim as my invention is—

1. The combination of the shafts $A'$ and $D^1$, the drum A, the wheel C, pinion D, hollow cylinder E, wheel F, pinion G, and band-pulley H, constructed, arranged, and operated substantially as and for the purpose described.

2. The top piece $C^1$, with its groove $C^2$, with the shaft $D^1$, having the projection $D^3$ and eccentric journal $D^2$, in combination with the parts described in the first clause of claim, constructed and operated substantially as and for the purpose described.

3. The brake $e$ and $f$ in combination with the parts described in the first clause of claim, constructed substantially as and for the purpose described.

JAMES M. FOLSOM.

Attest:
HENRY DOUGLASS HAWES,
CHARLES J. CLARKE.